Oct. 21, 1958

C. C. STRICKLEN 2,857,205

LUG LOCKING DEVICE FOR DUAL WHEELS

Filed Feb. 14, 1956

INVENTOR.

Clifford C. Stricklen

BY *Victor J. Evans & Co.*

ATTORNEYS

United States Patent Office 2,857,205
Patented Oct. 21, 1958

2,857,205

LUG LOCKING DEVICE FOR DUAL WHEELS

Clifford C. Stricklen, Burnsville, Miss.

Application February 14, 1956, Serial No. 565,378

5 Claims. (Cl. 301—9)

This invention relates to lug bolts for mounting dual wheels, and in particular a lug bolt threaded into an inner lug nut with an outer lug nut threaded on the inner lug nut and with the inner lug nut secured in position on the lug bolt with a pin until the outer lug nut, which is retained to the inner lug nut with a cotter pin is removed to permit removal of the pin retaining the inner lug nut on the lug bolt.

The purpose of this invention is to provide means for holding an inner lug nut until an outer lug nut which is threaded on the inner lug nut, is removed.

With conventional lug bolt and nut mountings of dual wheels, and particularly where a wheel is not removed for a relatively long period of time it is difficult to break the outer lug nut loose and as no provision is made for holding the inner lug nut the inner lug nut turns with the outer lug nut making it substantially impossible to remove the outer lug nut. With this thought in mind this invention contemplates drilling through the inner lug nut and lug bolt and placing a pin in the opening with ends of the pin extended through the lug bolt and into slots in the inner lug nut whereby the inner lug nut is held stationary as the outer lug nut is removed.

The object of this invention is, therefore, to provide an improved lug bolt mounting particularly adapted for securing dual wheels on axles of motor vehicles in which means is provided for preventing turning of the inner lug nut positioned on the lug bolt to facilitate removing the outer lug nut.

Another object of the invention is to provide an improved lug bolt assembly which includes means for holding the inner lug nut in the stud or lug bolt as the outer lug nut is removed in which the device is adapted to be incorporated in lug bolt mountings of dual wheels now in use.

A further object of the invention is to provide an improved lug bolt assembly that includes means for holding an inner lug nut as an outer lug nut is removed in which the assembly is of a simple and economical construction.

With these and other objects and advantages in view the invention embodies a lug bolt having a threaded pin with a transversely disposed opening extended therethrough, an inner lug nut threaded on the lug bolt and having slots positioned to register with the opening through the lug bolt, a pin positioned in the opening of the lug bolt and having ends extended into the slots of the inner lug nut, an outer lug nut threaded on the inner lug nut, and a cotter pin extended through a hub of the outer lug nut and also through an opening in the inner lug nut.

Other features and advantages of the invention will appear from the following description taken in connection with the drawing, wherein.

Figure 1:
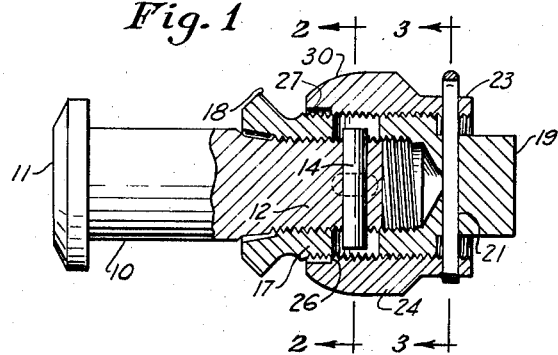
Figure 1 is a longitudinal section through the improved lug bolt assembly, the head portion of the lug bolt being shown in elevation.
Figure 2:
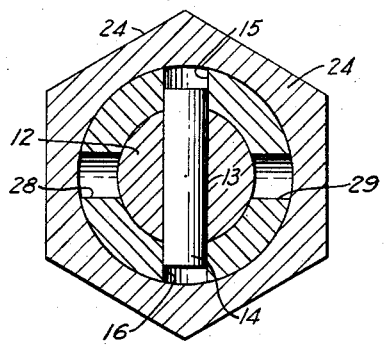
Figure 2 is a cross section through the lug bolt and nut assembly being taken on line 2—2 of Fig. 1 and the parts being shown on an enlarged scale.

Referring now to the drawing wherein like reference characters denote corresponding parts the improved lug bolt assembly of this invention includes a bolt 10 having a head 11 on one end and a threaded shank 12, the diameter of which is less than that of the portion 10, extended from the opposite end. The portion 12 is provided with an opening 13 in which a pin 14 is positioned. The pin 14 is positioned in the opening 13 with the ends extended into slots 15 and 16 in the inner lug nut making it possible to remove or replace the outer lug nut with the pin extended through the body of the inner lug nut and lug bolt.

Figure 3:
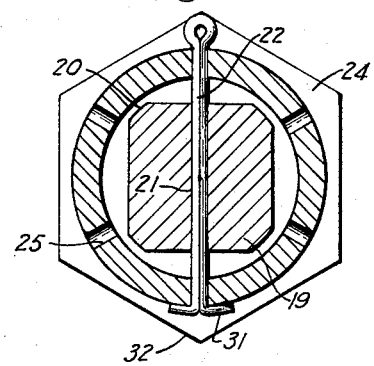
Figure 3 is a cross section through the hub of the outer lug nut and stud of the inner lug nut showing a cotter pin extended through the outer and inner lug nuts.
Figure 4:
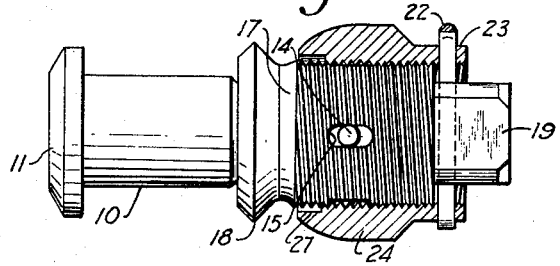
Figure 4 is a longitudinal section through the outer lug nut with the inner lug nut and lug bolt shown in elevation illustrating the arrangement of the locking pin and cotter pin.

The inner lug nut, in which the slots 15 and 16 are positioned, and which is indicated by the numeral 17 is provided with an outwardly flared end 18 and the opposite end is provided with a substantially square lug or shank 19 the corners 20 of which are beveled, as illustrated in Fig. 3. The inner lug nut is also provided with a transversely disposed opening 21 in which is a cotter pin 22 that also extends through the hub 23 of the outer lug nut 24. The hub 23 of the outer lug nut 24 is provided with a plurality of spaced openings 25 that are positioned to receive the cotter pin 22 thereby providing means for adjusting the position of the outer lug nut on the inner lug nut.

The lug nut 24 is threaded internally from the end of the hub 23 to a shoulder 26 providing an annular recess 27 that prevents engagement of threads of the outer lug nut with the inner end threads on the outer surface of the inner lug nut. The inner lug nut is also provided with radially disposed openings 28 and 29 similar to, and also in addition to the openings 15 and 16 providing means for adjusting the positions of the inner lug nut on the lug bolt. The outer surface 30 of the outer lug nut 24 is curved to correspond with sockets in webs of wheels adapted to be mounted by the lug bolt assembly.

With the parts designed and assembled in this manner the lug bolts and inner lug nuts are assembled with the pins 14 extended through the openings 13 and with the ends in the slots 15, 16, 28 or 29 and after threading the outer lug nuts on the inner lug nuts the cotter pins 22 are inserted, as shown in Fig. 1 whereby, with the ends 31, of the cotter pins clinched over, as illustrated in Fig. 3 the parts are retained in assembled relation until the cotter pin is manually removed.

When it is desired to remove a wheel the cotter pin 22 is removed and the outer lug nut, which is provided with flat sides 32 is removed from the inner lug nut whereby the pin 14 is free to drop from the opening 13 in the threaded portion 12 of the lug bolt 10 making it possible to remove the inner lug nut 17. By this means the inner lug nut is retained in position until the outer lug nut is removed by preventing the inner lug nut rotating as the outer lug nut is being removed.

It will be understood that modifications, within the scope of the appended claims, may be made in the design and arrangement of the parts without departing from the spirit of the invention.

What is claimed is:

1. A lug bolt assembly for dual wheels comprising a lug bolt having a head on one end and a threaded section on the opposite end, an inner lug nut threaded on the threaded section of the lug bolt, means for keying the inner lug nut to the lug bolt, an outer lug nut threaded on the inner lug nut, and means for securing the outer lug nut to the inner lug nut.

2. A lug bolt assembly for dual wheels comprising a lug bolt having a head on one end and a threaded section on the opposite end, an inner lug nut threaded on the threaded section of the lug bolt, means for keying the inner lug nut to the lug bolt, an outer lug nut threaded on the inner lug nut, said inner lug nut having a stud extended from one end and a cotter pin extended through the outer lug nut and the stud on the inner lug nut for securing the outer lug nut to the inner lug nut.

3. A lug bolt assembly for dual wheels comprising a lug bolt having a head on one end and a threaded section on the opposite end, an inner lug nut threaded on the threaded section of the lug bolt, a pin extended through an opening in the lug bolt and into slots in the inner lug nut for keying the inner lug nut to the lug bolt, an outer lug nut threaded on the inner lug nut, and means for securing the outer lug nut to the inner lug nut.

4. In a mounting for dual wheels, the combination which comprises a lug bolt having a head on one end and a threaded portion, the diameter of which is less than that of the bolt, on the opposite end, said threaded portion having an opening therethrough, an inner lug nut threaded on the threaded portion of the lug bolt and having slots therethrough, the slots of the inner lug nut being adapted to register with the opening through the threaded portion of the lug bolt, a pin extended through the opening of the threaded portion of the lug bolt and positioned with ends in the slots of the inner lug nut, said inner lug nut having a stud with an opening therethrough extended from one end, an outer lug nut threaded on the inner lug nut and having openings through a hub on one end, the openings through the hub of the outer lug nut being positioned to register with the opening through the stud of the inner lug nut, and a cotter pin extended through the openings of the inner lug nut stud and hub of the outer lug nut for retaining the outer lug nut in position upon the inner lug nut.

5. In a mounting for dual wheels, the combination which comprises a lug bolt having a head on one end and a threaded portion, the diameter of which is less than that of the bolt, on the opposite end, said threaded portion having an opening therethrough, an inner lug nut threaded on the threaded portion of the lug bolt and having slots therethrough, the slots of the inner lug nut being adapted to register with the opening through the threaded portion of the lug bolt, a pin extended through the opening of the threaded portion of the lug bolt and positioned with ends in the slots of the inner lug nut, said inner lug nut having a stud with an opening therethrough extended from one end, an outer lug nut threaded on the inner lug nut and having openings through a hub on one end, the openings through the hub of the outer lug nut being positioned to register with the opening through the stud of the inner lug nut, and a cotter pin extended through the openings of the inner lug nut stud and hub of the outer lug nut for retaining the outer lug nut in position upon the inner lug nut, the stud of the inner lug nut and the outer surface of the outer lug nut having wrench gripping surfaces thereon.

References Cited in the file of this patent

UNITED STATES PATENTS

| | | |
|---|---|---|
| 769,033 | Turner | Aug. 30, 1904 |
| 778,107 | Burks | Dec. 20, 1904 |
| 1,940,675 | Crowther | Dec. 26, 1933 |
| 2,369,856 | Roberts | Feb. 20, 1945 |
| 2,404,520 | Mosher | July 23, 1946 |